July 1, 1958 L. J. NOVAK ET AL 2,841,578
METHOD FOR PRODUCING CLINICAL DEXTRAN
Filed Aug. 28, 1953
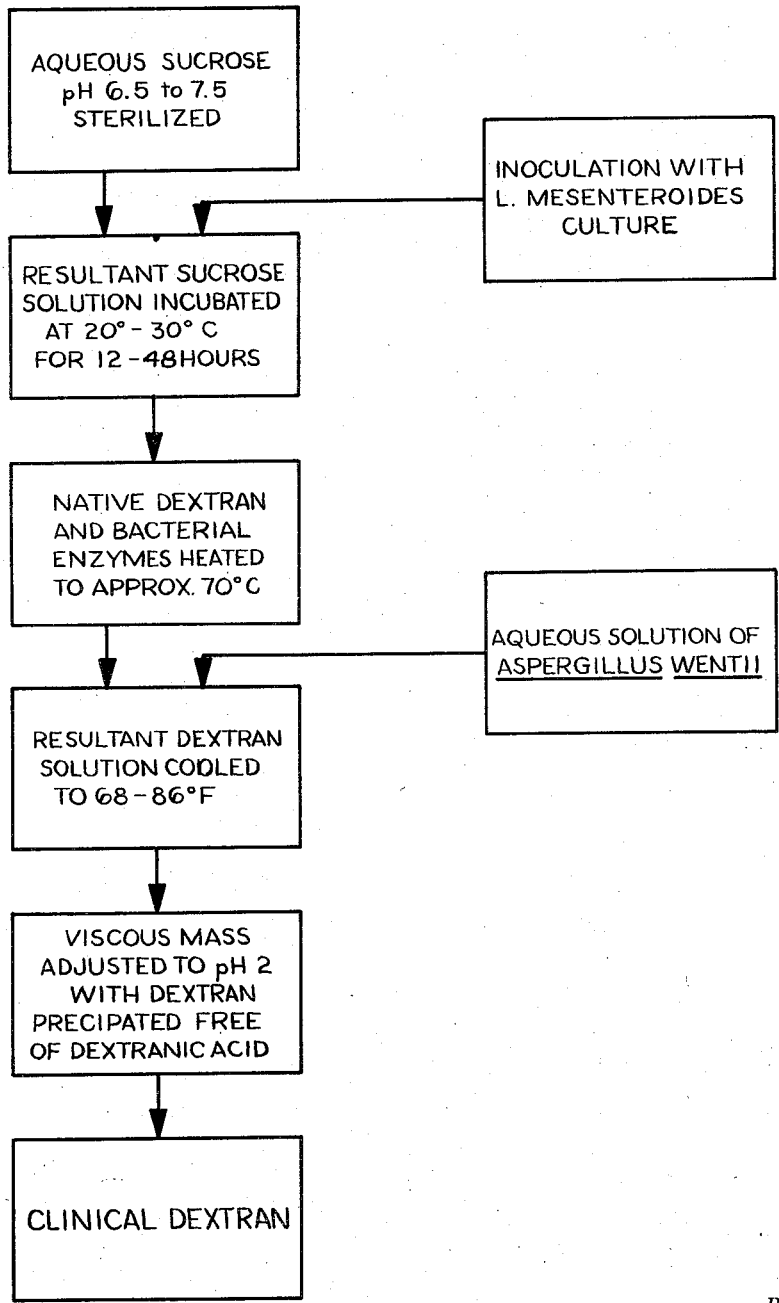
INVENTORS
LEO J. NOVAK
GEORGE STOYCOS
BY Toulmin & Toulmin
ATTORNEYS

United States Patent Office 2,841,578
Patented July 1, 1958

2,841,578

METHOD FOR PRODUCING CLINICAL DEXTRAN

Leo J. Novak and George S. Stoycos, Dayton, Ohio, assignors to The Commonwealth Engineering Company of Ohio, Dayton, Ohio, a corporation of Ohio Application August 28, 1953, Serial No. 377,232

2 Claims. (Cl. 260—209)

This invention relates to the production of dextran having a molecular weight in the desired range for a blood plasma extender to be injected intravenously.

It is known that dextran, a polysaccharide made up of anhydroglucopyranosidic units joined by linkages some, and apparently at least 50% of which, are alpha- 1,6 linkages, may be obtained by the action of certain microorganisms, such as those of the *Leuconostoc mesenteroides* and *L. dextranicum* types, or enzymes therefrom, on sucrose-bearing culture media.

Thus, if an aqueous culture medium containing sucrose, particular nitrogenous compounds and certain inorganic salts is inoculated with the microorganism *Leuconostoc mesenteroides* B-512 (Northern Regional Research Laboratory classification) and the inoculated medium is incubated at about 25° C., there is obtained a so-called "native" dextran having an extremely high average molecular weight calculated to be in the millions and too high to be safely injected intravenously.

In order to obtain dextran having a molecular weight at which it can be injected safely, and function as an effective plasma extender to alleviate conditions of shock, it has been necessary to split the native dextran into segments of lower average molecular weight. Acid has been used for hydrolyzing the native dextran, but results in a heterogeneous product comprising dextran segments having a wide range of molecular weights. It is known that, in order to isolate "clinical" dextran from the heterogeneous acid hydrolysis product, it is necessary to subject the latter to fractionation, using tedious, expensive and time-consuming fractional precipitation or fractional solution procedures.

More recently, it has been found that dextran of relatively high average molecular weight, such as native B-512 dextran, can be hydrolyzed to dextran segments of relatively lower, predetermined average molecular weight, by the action of dextranase produced by an amino acids-stimulated mold of the genus Aspergillii which is acclimatized to dextran, and particularly of dextranase produced by amino acids-stimulated, dextran acclimatized *Aspergillus wentii*.

It appears that the dextranase produced by the amino acids-stimulated, dextran acclimatized Aspergillii mold has the capacity to split the dextran of high molecular weight, preferentially initially at the interior glucosidic linkages, into segments of lower molecular weight which can be predetermined by controlling the interrelated conditions of time, temperature and pH so that, by preselection and correlation of those conditions, there is obtained a degradation (hydrolysis) product from which dextran having the molecular weight range suitable for intravenous injection, or substantially that weight, can be precipitated directly and which does not require further tedious working up, such as extensive fractional precipitations to isolate from the precipitate a dextran which can be injected safely, or which requires much simpler fractionating treatment and handling to render it suitable for intravenous injection, than is necessary when the native dextran is hydrolyzed by means of acid.

The discovery of this unique capacity of the dextranase derived from the amino acids-stimulated, dextran-acclimated Aspergillii represented an extremely important advance in the art. However, in practice, it was found that during hydrolysis of the dextran by the enzyme, there is formed a relatively small but troublesome amount of a carboxylated substance which we call "dextranic acid." The presence of the dextranic acid in the hydrolysis product complicates separation of the hydrolyzed dextran segments of desired molecular weight therefrom.

An acceptable "clinical" dextran may have an average molecular weight in the range 60,000 to 80,000 as determined by light-scattering measurements and may comprise segments of varying weight so long as the average weight is in the range given and the 10% thereof of lowest molecular weight has a weight not less than 25,000, while the 10% thereof of highest molecular weight has a weight not over 200,000. The present invention is concerned with the separation of injectable clinical dextran from the enzyme-hydrolyzed product comprising dextranic acid.

A flow sheet on accompanying drawing illustrates a preferred procedure in carrying out the process of the invention.

In accordance with the invention, the clinical dextran, or a product which meets the specifications for clinical dextran after relatively simple after-treatment, is separated from the enzyme-hydrolyzed product by the addition of a non-solvent precipitant for the dextran thereto while the hydrolysis product has a pH in the range 1.0 to 5.0. The precipitant may be any water-miscible organic solvent which is a non-solvent for the dextran, such as acetone or a water-miscible lower aliphatic alcohol, e. g., methanol or isopropanol, and is preferably used in an amount equal in volume to that of the aqueous medium containing the hydrolysis product. The precipitate obtained by adding an equal volume of acetone or lower aliphatic alcohol to the aqueous medium containing the dextranic acid and the dextranase-hydrolyzed dextran results in the precipitation of dextran which is substantially or completely free from the dextranic acid and which may have, as precipitated, substantially the molecular weight range approved for clinical dextran.

Hydrolysis of the native dextran by the action of the Aspergillii-derived enzyme may be accomplished in the fermentate containing native dextran, or the latter may be separated from the fermentate and dissolved in water prior to subjecting it to the enzyme action.

At the conclusion of the hydrolysis, the splitting action of the dextranase on the dextran is stopped by adjusting the pH of the hydrolysis medium to 2.0–3.0 or to 8.0–11.0. If acid is used to stop the splitting reaction by adjusting the pH to 2.0 to 3.0, the precipitant, preferably in amount of 50% by volume, may be added to the acid medium without further treatment of the latter, since the pH of 2.0 to 3.0 is in the range at which we have found that the hydrolyzed dextran may be selectively, or substantially selectively, precipitated. On the other hand, if the splitting reaction is stopped by adding alkali, such as a strong alkali metal hydroxide, e. g., sodium hydroxide, to the medium, then acid is added to the mass to adjust the pH to a value in the range 1.0 to 5.0 before the precipitant is mixed with the mass.

The following is a detailed example of one embodiment of the method of the invention.

EXAMPLE

An aqueous medium having the following composition is prepared:

| | Percent by weight |
|---|---|
| Sucrose | 5–10 |
| Corn steep liquor | 2 |
| Monobasic potassium phosphate | 0.5 |
| Manganous sulfate | 0.002 |
| Sodium chloride | 0.50 |
| Water | Balance |

This medium is adjusted to a pH between 6.5 and 7.5, preferably 7.2, and then sterilized. The material is cooled to room temperature, inoculated with a culture of *Leuconostoc mesenteroides* B–512, and incubated at 20° C. to 30° C. (optimum 25° C.) until a maximum yield of dextran has been attained; normally a period of between 12 and 48 hours will be satisfactory.

The resulting fermentate is a thick turbid liquid which usually contains, in addition to water and the native dextran, bacterial enzymes. It is heated to a temperature above 70° C., preferably to boiling, to inactivate any bacterial enzymes which may be present, particularly dextransucrase, and to stabilize the system. It is then cooled and from 0.1% to 10% by volume of an aqueous solution of the Aspergillus-derived dextranase is introduced. The digestion temperature is that of the room (68° F. to 86° F., usually 76° F.).

The progress of the hydrolysis is indicated by progressive lowering of the viscosity of the solution, and the mass is allowed to stand until it has a relative viscosity of 1.0 to 5.0, usually about 2.0±0.5 at 25° C., this viscosity being an indication that the hydrolysis has proceeded to the point at which the native dextran is hydrolyzed to clinical dextran in optimum yield, and that it is time to stop the reaction.

When the viscosity reaches the value stated, the reaction is stopped by the addition of a sufficient amount of hydrochloric acid to adjust the pH to 2.0. Since this pH is in the range at which the hydrolyzed dextran may be precipitated selectively, isopropanol is added to 50% by volume. After a suitable settling time, usually about one hour, or when the supernatant is relatively clear, the supernatant is decanted and the precipitated dextran is recovered. In order to insure that the dextran is free of dextranic acid, the foregoing procedure may be repeated one or more times, that is, the precipitated dextran may be re-dissolved in water, the solution may be adjusted to pH 2.0 by the addition of acid, and the precipitant added to the acidified solution.

Our results show that, after two workings up as described, the dextran obtained frequently has a molecular weight (determined by light-scattering measurements) and a molecular mono-dispersity which meets present U. S. military specifications for an acceptable dextran blood plasma extender.

An outstanding advantage of this method of obtaining the blood plasma extender is that the dextran is obtained in a yield greater than 25% by weight, based on the weight of crude or "native" dextran, which is significantly higher than the yield of 10% to 12% by weight obtained by present industrial processes in which the crude dextran is subjected to acid hydrolysis.

The exemplified conditions may be modified so that the hydrolysis product is adjusted to pH 1.0 to 3.5 prior to the addition of the precipitant.

The specific conditions given in the example are optimum for crude dextran obtained by inoculating the sucrose-bearing nutrient medium with *Leuconostoc mesenteroides* B–512 and may be varied somewhat. Thus, the dextran may be precipitated from the hydrolysis product at pH 1.0 to 5.0 by adding from 35% to 65% by volume of the organic solvent precipitant thereto, and acids other than hydrochloric acid may be used for adjusting the pH of the solution to the desired value.

The action of the dextranase on the dextran may be stopped, by either acid or alkali treatment to the stated pH values, when the relative viscosity of the solution drops to a value in the range 1.0 to 5.0.

In addition, the hydrolyzed dextran precipitated one or more times from the hydrolysis solution at pH 1.0 to 5.0, specifically at pH 1.0 to 3.5, and most desirably in the case of dextran synthesized in the sucrose-bearing medium by *Leuconostoc mesenteroides* B–512 at pH 2.0 to 3.5, may be subjected to further working up, such as fractional precipitation using acetone or a lower aliphatic water-miscible alcohol, or fractional solution using a mixture of the precipitant and water, if desired or required.

The dextranase used to hydrolyze the native dextran may be obtained rapidly and in copious amounts by cultivating the Aspergillus mold, especially *Aspergillus wentii*, in a nutrient medium which is an aqueous composition of matter having a controlled pH between 7.0 and 7.5 and containing dissolved metallic salts and, per liter of water, from 2.0 to 6.0 gms. of an amino acid, amino acid mixture or protein source of amino acids and from 5.0 to 50.0 gms. of dextran, as well as various growth supplements including B-vitamins which may be added in the complex form. The following is a typical nutrient medium which may be used at optimum controlled pH of 7.0 to 7.5 and room temperature.

*Dextran-salts solution*

| Component: | Grams/liter |
|---|---|
| Peptone | 5.0 |
| Dextran | 10.0 |
| MgSO$_4$ | 0.1 |
| NaCl | 0.1 |
| FeSO$_4$ | 0.01 |
| MnSo$_4$ | 0.01 |
| KH$_2$PO$_4$ | 0.1 |
| Sodium acetate | 2.0 |
| Potassium acetate | 0.5 |

*B-vitamin*

| | Milligrams/liter |
|---|---|
| Nicotinic acid | 1.0 |
| Riboflavin | 0.5 |
| Thiamine | 0.5 |
| Ca pantothenate | 0.5 |
| Pyridoxine | 0.4 |
| Folic acid | 0.01 |
| Biotin | 0.001 |

The dextranase may be introduced into the fermentate or aqueous solution containing the dextran to be hydrolyzed or split in the form of the mold filtrate, or it may be isolated from the filtrate by adding acetone to the latter in an amount to give an acetone concentration of 35% to 55%. The precipitated dextranase, which occurs as a white powder, may be collected and added as such, or in aqueous solution, to the medium comprising the dextran to be split.

The dextranase may also be recovered from the clear mold filtrate by precipitation with other organic solvents such as dioxane and alcohols, or by "salting out," using inorganic salts such as ammonium sulfate, sodium sulfate, and sodium chloride.

For example, a highly potent concentrate of the dextranase is obtained by (1) filtering the nutrient to remove the mold mat; (b) adding ammonium sulfate to the filtrate at the level of 70 grams thereof per 100 cc. of filtrate and recovering the resulting precipitate; (c) re-dissolving the dextranase-containing precipitate in an amount of water corresponding to approximately one-tenth the original volume of the filtrate of (b); (d) re-precipitating the dextranase with ammonium sulfate; (e)

repeating the cycle of dissolving the dextranase in water and precipitating it with ammonium sulfate several times, continuing to decrease the volume of solution involved; (f) dialyzing the final solution to remove extraneous salts; (g) precipitating the dextranase by adding acetone to a concentration of approximately 70%; and (h) drying the resulting precipitate to obtain the dextranase as a stable, highly potent powder. Alternatively, the final, dialyzed solution may be freeze-dried to yield the dextranase as a stable, active powder.

This invention has been described in detail in connection with "clinical" dextran for intravenous injection as a blood plasma extender. It will be apparent, however, that the action of the dextranase on the dextran being split can be stopped when the relative viscosity of the solution has been decreased to any predetermined extent and, therefore, it will be understood that the method may be practiced with advantage when it is desired to obtain, from dextran of relatively high average molecular weight, a dextran of lower average molecular weight which does not necessarily have a weight suitable for intravenous injection but which is free of dextranic acid and suitable for purposes other than administration by intravenous injection.

Also, it is to be understood that, although the invention has been exemplified as practiced for the dextranase hydrolysis of dextran synthesized by bacteria, specifically *Leuconostoc mesenteroides*, the invention is not limited to that embodiment, since the dextran to be hydrolyzed may be obtained in other ways, as by enzyme synthesis in the substantial absence of bacteria, by bacterial conversion of 1,4 linkages of dextrin to 1,6 linkages of dextran, or in any other feasible manner.

The dextranic acid present in the alcoholic supernatant separated from the dextran precipitated at 1.0 to 5.0 pH may be recovered in purified condition by adjusting the pH of the supernatant to a value in the range 8.0 to 13.9, preferably about 11.0, with 50% alcoholic (methanolic) sodium hydroxide to precipitate sodium dextranate as a white powder, re-dissolving the salt in water at neutral or acid pH, adding an equal amount of lower aliphatic alcohol to the solution, and alkalinizing the alcohol-water mixture to a pH of about 12.0 to precipitate dextranic acid. This material has an average molecular weight not greater than 50,000 (determined by light-scattering measurements), a low relative and intrinsic viscosity, and combines with bases to form salts.

Since modifications and variations may be made in practicing the present method within the scope of the disclosure, it will be understood that such modifications and variations are intended to be embraced in the appended claims.

We claim:

1. In the separation of hydrolyzed dextran from aqueous solutions thereof resulting from the hydrolytic action of the dextranase elaborated by the mold *Aspergillus wentii* on dextran of relatively high molecular weight, which solutions contain, in addition to the hydrolyzed dextran, dextranic acid produced as a by-product of the hydrolysis of the dextran by said mold, the improvement which comprises separating the hydrolyzed dextran from said solution in a condition in which it is substantially free of the dextranic acid, by the step of (A) adding to the solution, at a pH of 1.0 to 5.0, about 50% by volume of a precipitant for the hydrolyzed dextran selected from the group of water-miscible lower aliphatic alcohols and ketones, collecting the precipitated hydrolyzed dextran and the step (B) of dissolving the precipitated hydrolyzed dextran in water, and adding to the solution thus obtained, at a pH of 1.0 to 5.0, about 50% of the precipitant for the hydrolyzed dextran, step (B) being performed at least once.

2. The process of claim 1, characterized in that the starting aqueous solution comprises hydrolyzed dextran having a molecular weight substantially corresponding to the molecular weight of clinical dextran suitable for intravenous injection.

References Cited in the file of this patent

UNITED STATES PATENTS

| | | |
|---|---|---|
| 2,310,263 | Stahly | Feb. 9, 1943 |
| 2,437,518 | Gronwall | Mar. 9, 1948 |
| 2,565,507 | Lockwood | Aug. 28, 1951 |
| 2,644,815 | Gronwall | July 7, 1953 |
| 2,660,551 | Koepsell et al. | Nov. 24, 1953 |
| 2,709,150 | Carlson et al. | May 24, 1955 |

FOREIGN PATENTS

| | | |
|---|---|---|
| 675,025 | Great Britain | July 2, 1952 |

OTHER REFERENCES

Hultin et al.: Chemica Scandinavica, 1949, pp. 1405–1417.